Jan. 24, 1956   E. O. CARPENTER ET AL   2,732,521
ELECTRIC MOTOR CONTROL SYSTEM FOR A REPRODUCING MACHINE
Filed Jan. 11, 1951   4 Sheets-Sheet 1

INVENTORS
EDWIN O. CARPENTER
JOHN M. MORGAN, JR.
MILTON V. WATERS
BY H. K. Parsons & L. W. Wright
ATTORNEYS INVENTORS
EDWIN O. CARPENTER
JOHN M. MORGAN, JR.
MILTON V. WATERS
BY H. K. Parsons & L. W. Wright
ATTORNEYS

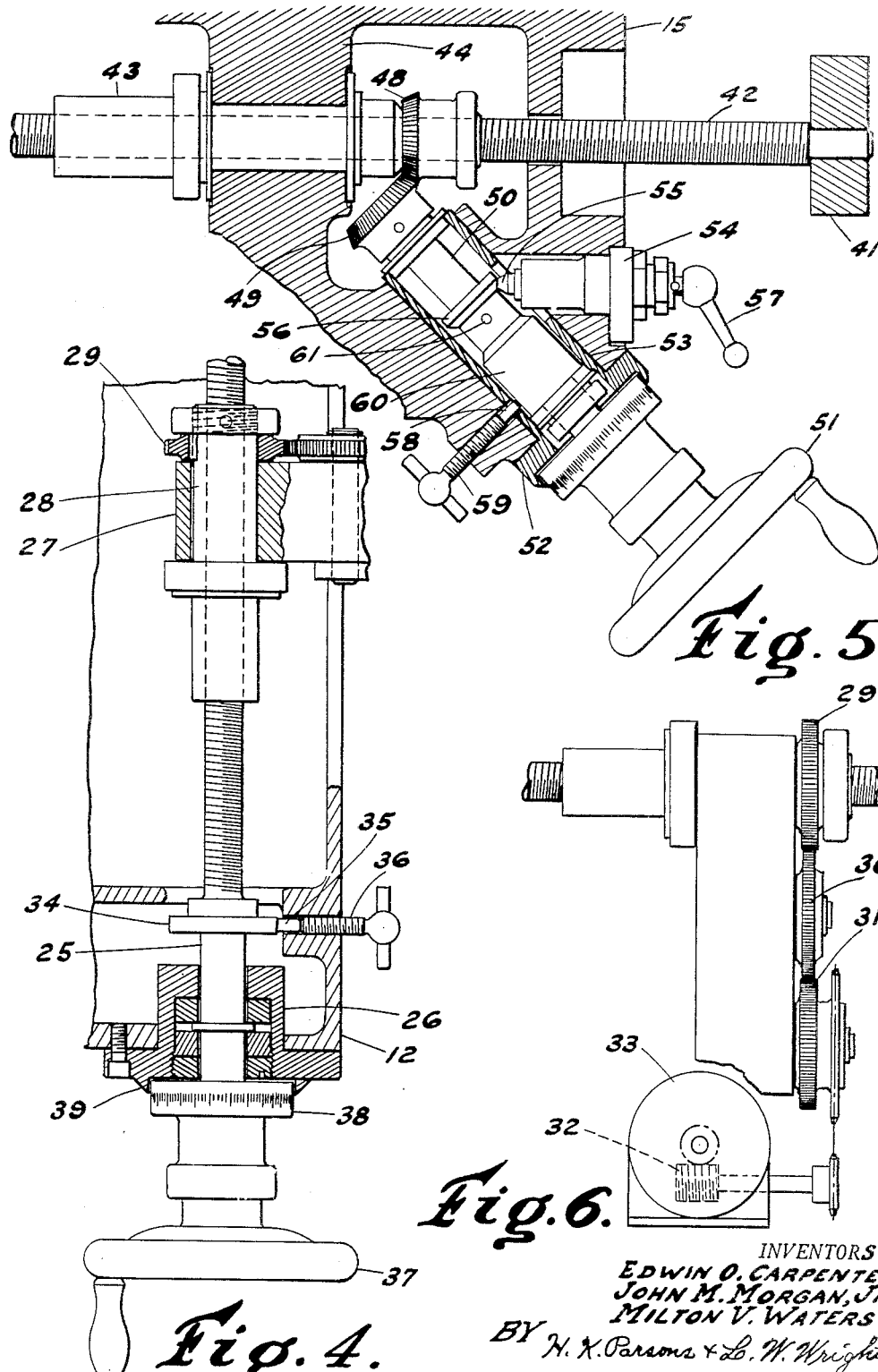

INVENTORS
EDWIN O. CARPENTER
JOHN M. MORGAN, JR.
MILTON V. WATERS
BY H. K. Parsons & L. W. Wright
ATTORNEYS United States Patent Office 2,732,521
Patented Jan. 24, 1956

2,732,521

ELECTRIC MOTOR CONTROL SYSTEM FOR A REPRODUCING MACHINE

Edwin O. Carpenter, John M. Morgan, Jr., and Milton V. Waters, Cincinnati, Ohio, assignors to The Cincinnati Milling Machine Co., Cincinnati, Ohio, a corporation of Ohio Application January 11, 1951, Serial No. 205,568

17 Claims. (Cl. 318—39)

This invention relates to improvements in reproducing machines and has particular reference to the mechanism for controlling the relative movements of work and cutter.

One of the objects of the present invention is the provision of an improved control mechanism alternatively available for power or manual actuation of the movable parts of the machine.

A further object of the invention is the provision of an improved feed and traverse control mechanism applicable to standard types of milling machines for effecting continuous cycle operation of the parts in a manner to insure complete coverage of the surface of the work which is to be machined by the cutting tool.

An additional object is the provision of a control mechanism which may be built in as an integral part of the machine or, alternatively, may be applied to existing machines accurately to determine the sequential cyclic relative movement of tool and work piece and the sequential relative indexing of the parts at one or both ends of the reciprocating cutting stroke.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 4 is a fragmentary horizontal sectional view through the saddle adjusting mechanism on the line 4—4 of Figure 1.

Figure 5 is a similar view of the table adjusting mechanism on the line 5—5 of Figure 1.

Figure 6 is an elevational view of the power drive means for control of saddle movement.

Figure 1:
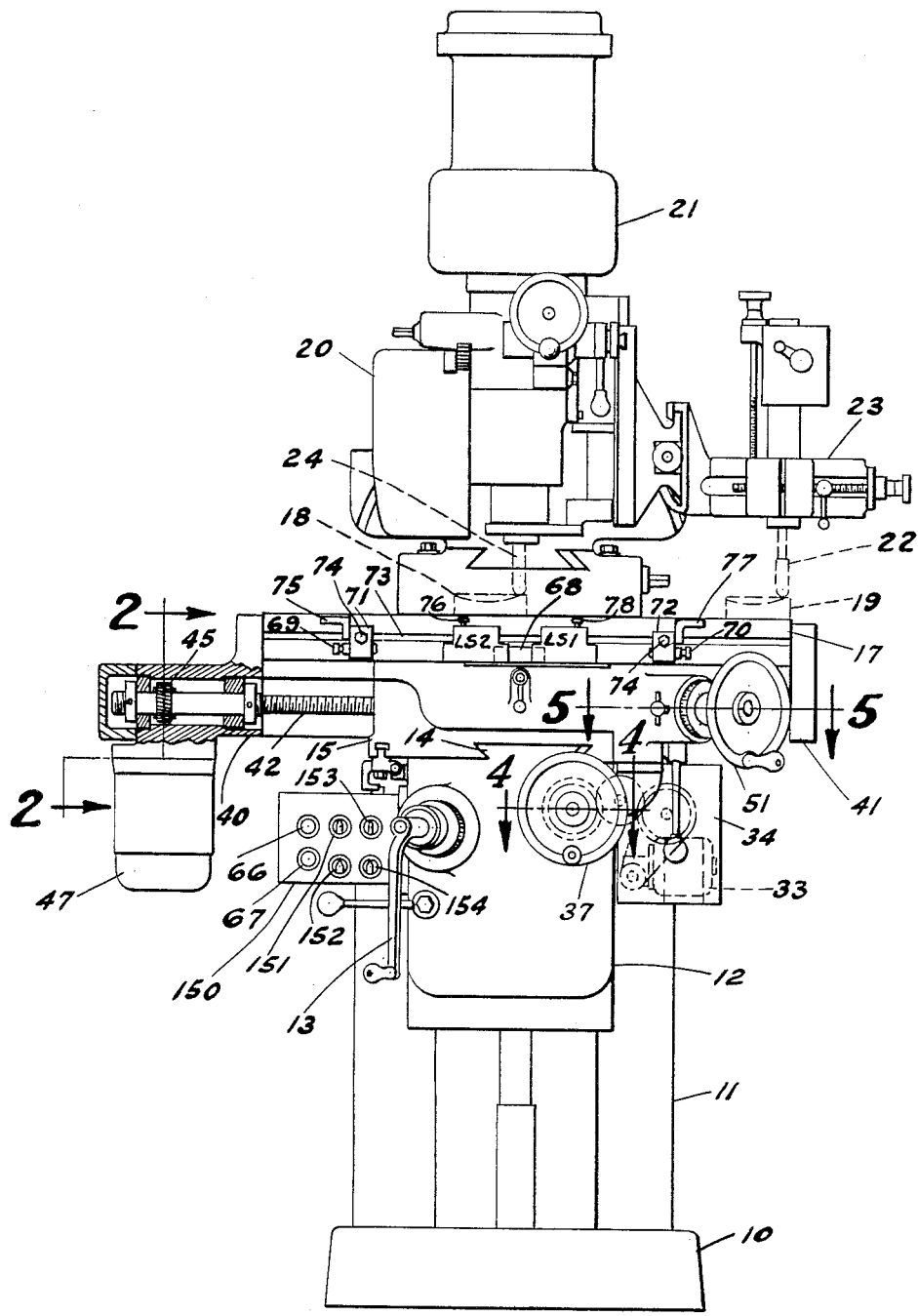
Figure 1 is a front elevation of a machine embodying the present invention.
Figures 2, 3:
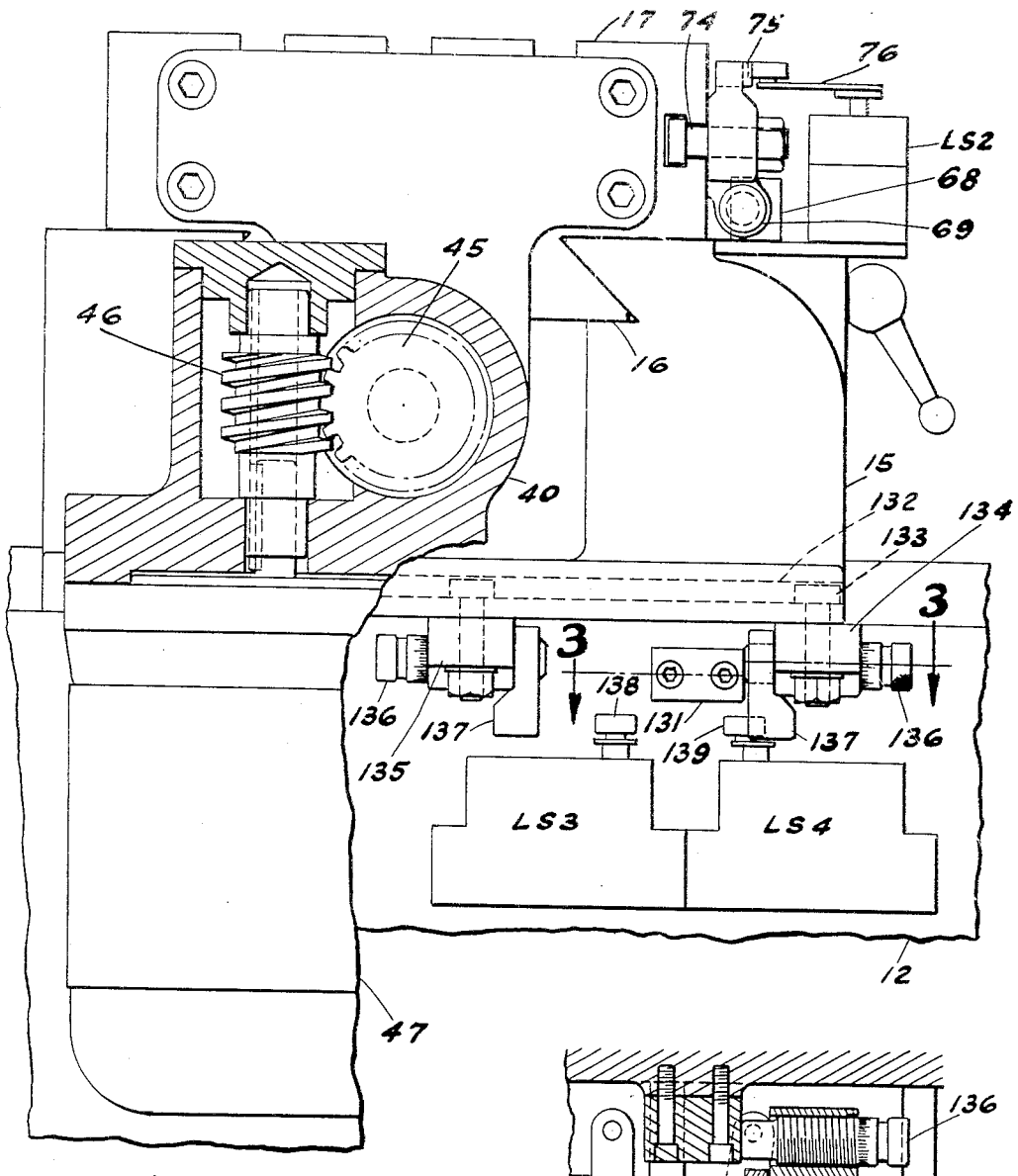
Figure 2 is an enlarged view partially in elevation, partially in section on the line 2—2 of Figure 1.
Figure 3 is a fragmentary horizontal sectional view on the line 3—3 of Figure 2.

In the form of invention chosen for purposes of illustration, the improvements have been shown as embodied in a reproducing or a milling machine of the knee and column type as shown in Figures 1 and 2 comprising the base 10 having rising therefrom a column 11 on which is vertically movable the knee 12, this movement being controlled in a conventional manner as by the handle 13. The knee 12 is provided with the ways 14 guiding the saddle 15 for in and out movement as respects the supporting column 11. The saddle, in turn, is provided with ways 16 reciprocably mounting the work supporting table 17 adapted to carry a work piece 18 and a pattern 19.

Mounted on the upper portion of the column in the spindle head 20 vertically movable as by piston and cylinder mechanism indicated at 21 which is under control of the tracer finger 22 carried by bracket 23 in overlying relation to the pattern 19. Such a tracer controlled machine, and particularly the details of automatic vertical movement of the cutter 24 with respect to the work as determined by tracer 22, are described and claimed in detail in copending application, Serial No. 778,308.

For effecting adjustment of the saddle upon the supporting knee in a direction toward or from the column, there is provided an adjusting screw 25 (Figure 4) rotatably but non-translatably supported in the bracket 26 secured to the front of the knee 12. Depending from the saddle 15 is an arm 27 in which is rotatably mounted the sleeve nut 28 having splined thereon a pinion 29 forming a part of the transmission train 30, 31 operable through worm 32 by the motor 33. This transmission train and motor is mounted in the housing 34 depending from the right hand portion of the saddle 15 as particularly indicated in Figure 1. The screw 25 is further provided with a brake flange 34 engageable by clamp pin 35 actuable by clamp screw 36 threaded into the side of the knee and positionable firmly to lock the screw 25 against rotation. Carried by the forward end of the screw is the manually actuable pilot wheel 37 including the graduated collar 38 cooperating with the pointer 39 on bracket 26 to visually indicate the manual adjustment which has been imparted by the screw to the saddle.

It will be understood that rotation of the screw by a pilot wheel 37 in one direction or the other will cause a back and forth movement of the nut and thus, through the associated arm 27, the saddle 15.

Alternatively, if the screw is locked against rotation as by tightening of the clamp screw 36, motor 33 may be actuated to rotate the nut 27 for effecting power adjustment of the saddle for either slight indexing purposes to vary the position of the successive paths of relative feeding of the work and cutter or for continuous cross movement of the saddle depending upon the particular motor controls utilized.

The basic structural features of the mechanism for effecting the back and forth feeding movements of the table are particularly illustrated in Figures 1, 2, and 5. By reference to these it will be noted that the table has the depending terminal portions at 40 and 41 in which is journaled for rotation, while held against relative longitudinal movement, the feed screw 42. This screw has intermediately mounted on it the sleeve nut 43 journaled for rotation in the rib 44 of the saddle 15 while held against longitudinal movement with respect thereto. It will be evident that if the sleeve nut 43 is held against rotation and the screw 42 rotated, the table will be given a feed movement to the right or left, depending on the direction in which the screw is rotated. Such a rotation may be effected through the medium of the worm gear 45 carried by the screw and meshing with worm 46 driven by motor 47 which is secured to the terminal portion 40 of the table.

Formed on or secured to the nut 43 as shown in Figure 5 is a bevel gear 48 engaged by the second beveled gear 49 on shaft 50 which has on its outer end the actuating pilot wheel 51. This shaft is rotatably supported by sleeve 52 fitting within a bore 53 in the saddle 15 and is held in position by the locking member 54 having the projectable spring tension plunger 55 engaging the collar 56 on the shaft 50. This insures proper interfitting engagement of the bevel gears 48 and 49, and in the position shown of the control handle 57 insures proper frictional resistance for ordinary turning operations of the shaft 50.

When, however, the screw is to be driven for effecting power translation of the table, use is made of the locking plunger 58 which may be tightened by the screw or clamp 59 against the sleeve 60 pinned as at 61 to shaft 50.

It will be understood that for manual adjusting purposes or operation of the table the clamp 59 is backed off into releasing position, the motor 47 and worm and worm gear connections to the screw 42 locking the same against rotation so that the translatory movement is effected by manual turning of the nut 43.

Alternatively, when the motor drive is to be employed, the member 59 is tightened, securely locking shaft 50 and thus nut 43 against rotation and power feeding may then be effected by the motor 47.

The particular machine illustrated is intended for reproducing purposes, that is, for forming a contour or surface on the work piece 18 corresponding in configuration to that already previously produced on the pattern 19. In effecting this operation the tracer member 22 rides, as shown in Figure 1, on the contoured face of the pattern 19 and by its up and down movement controls the hydraulic piston and cylinder mechanism 21 to effect corresponding vertical movement of the spindle carrier 20 and tool or cutter 24 which is in engagement with the work. With the parts thus positioned, as shown in Figure 1, it is conventional reproducing machine operation to effect relative movements of the work from right to left and forward and backward so that the tool and tracer will correspondingly pass over all portions of the work and pattern respectively. Such movements may be effected either simultaneously or alternatively. An effective manner of operation is to move the table from the left hand position shown in Figure 1 to the right the full length of the work and pattern and to then slightly shift or index the saddle so that a new cutting path will be established which will be followed by the cutter in the reverse movement of the table, although in some instances it may be desirable to feed back and forth along the same path for performance of a primary roughing and successive cleanup or finishing operation along that particular path before indexing to a new path.

The present improved control mechanism has been designed to determine automatically in accordance with the control settings these relative movements of the work and cutter, thus eliminating the necessity for hand performance of same by the operator or continuous attention of the operator to the machine while a work piece is being tooled or produced. The manner in which this is accomplished will be readily apparent by reference to the electrical control diagram, Figure 7, considered in connection with the mechanical or structural elements for circuit control as particularly shown in Figures 1, 2 and 3 of the drawings.

Figure 7:
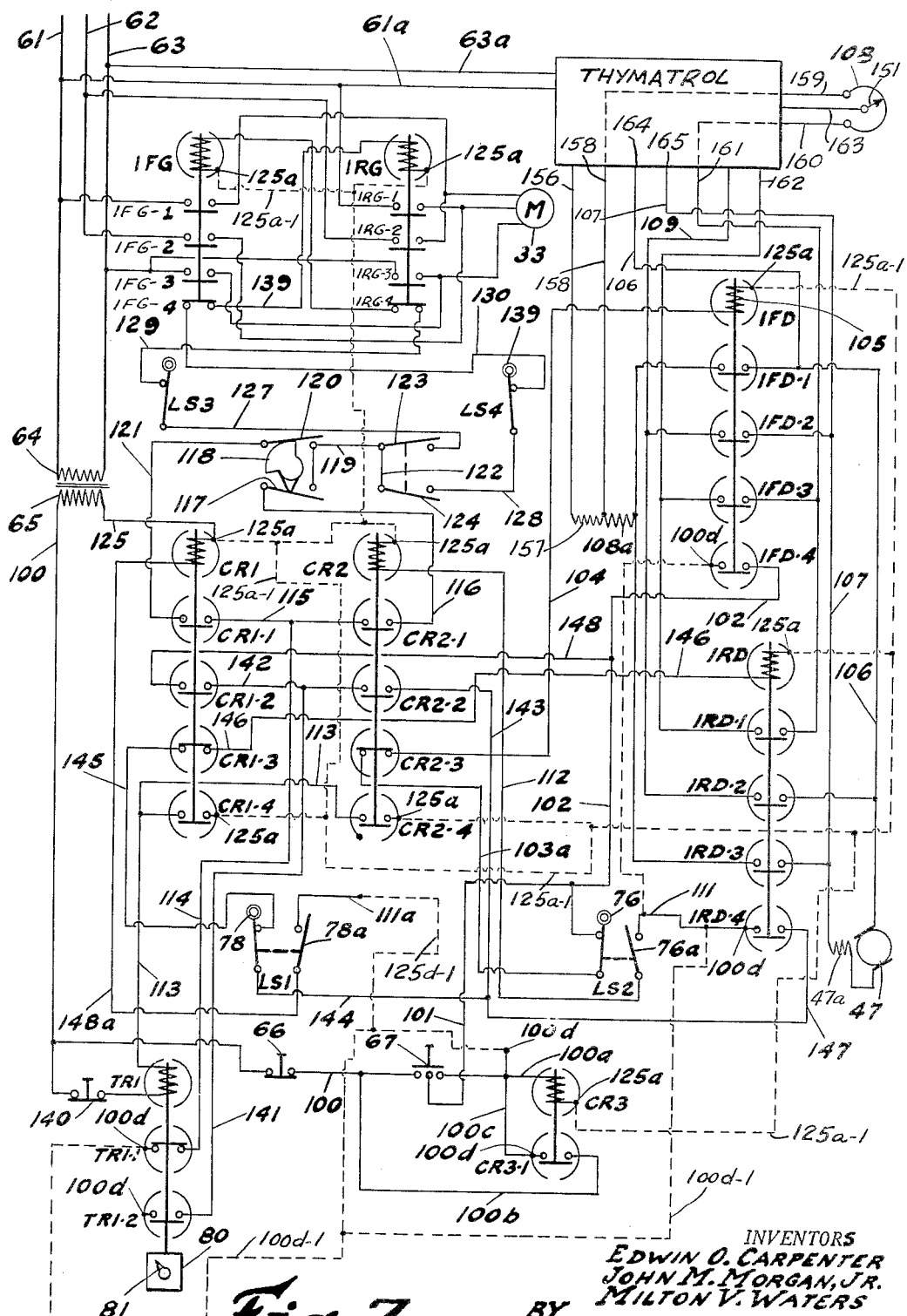
Figure 7 is a diagrammatic view of the electrical control circuit.

The electrical system as shown in Figure 7 includes conventional three-wire power leads 61, 62, and 63 supplying the power for operation of the motors 33 and 47, together with the transformer comprising the portions 64 and 65 for the low voltage, pilot or control circuit having the leads 100 and 125. For simplified understanding of the wiring diagram the several switch elements operable by the various control relays have been indicated on the diagram within semi-circles or parentheses. Additionally, certain of the left hand members of these parentheses have been provided with a dot or circle, indicating that these, designated by the reference character 100d, constitute terminals continuously coupled with the interruptable control circuit 100 as at 100d adjacent relay CR3 when this circuit is completed from the left hand portion of the transformer 65 by way of the stop switch 66 and starting switch 67 or control relay switch CR3-1. Correspondingly, certain of the right hand half circles enclosing certain of the control relays and switches operable thereby have been provided with a dot or circle designated by the reference character 125a, indicating that these particular elements constitute circuit connections permanently coupled with the opposite lead 125 of the transformer 65. The conductor 100d-1 connects the various dots 100d, and the conductor 125a-1 the dots 125a in Figure 7.

Considering the machine stopped in an intermediate position and with the starting switch 67 in open or circuit interrupting position, all control relays will be deenergized and the several switch elements will therefore occupy the positions shown in Figure 7.

To start the machine, it is, therefore, necessary to depress the starting switch button 67. This will complete the circuit from 100 through 100a to control relay CR3, the circuit then being completed to 125a—125. As this relay CR–3 is energized, it will close the holding switch CR3-1 so that the circuit will then be completed through 100b, CR3–1, 100c to 100a, maintaining a complete circuit from the left hand side 100 of the transformer 65 to 100d, 100d-1, which circuit has been correspondingly indicated by the dot or circle on left hand parentheses as respects TR1-1, TR1-2, CR2-4, CR3-1, 1FD-4 and 1RD-4.

At the same time that closing of switch 67 energizes the "100" circuit it also temporarily energizes or completes the circuit to conductor 101 coupled by 102 to the left hand element 76 of limit switch LS2. From this limit switch the circuit continues through conductor 103a, closed switch element CR2-3 of the series of switches under control of control relay CR2 and thence by conductor 104 through the coil 105 of control relay 1FD to the point 125a coupled with the right hand side 125 of transformer 65. This energizes 1FD, raising the entire series of switch elements controlled by it. Among these is the switch element 1FD-4 which when 1FD is energized closes the holding circuit 102, 1FD-4, 100d so that when the starting button 67 is released 1FD will remain energized.

The remaining switch elements 1FD-1, 1FD-2, and 1FD-3 determine the directional operation of the table feed motor 47 by effecting suitable power connections between the conductors 106 and 107 of this motor and the conventional "Thymotrol" or other D. C. motor speed control unit and said motor. In Figure 7 there has been diagrammatically indicated the control panel for a CR7507–F101A16 "Thy-mo-trol drive" of a type well known to the art for years and commercially manufactured by General Electric. This "Thymotrol" unit includes the reversible D. C. motor indicated at 47 having the commutator field 47a, series field 108a, and shunt field 157. The necessary power is supplied to this Thymotrol unit 155 by the leads 61a and 63a, the rate of power output and speed of the motor being selectively determined by adjustment of the potentiometer 103. Leading from the unit 155 is the conductor 156 having a constant D. C. voltage output. This conductor is connected to one side of the shunt field 157 of the motor 47, the opposite side of the shunt field and one side of the series field 108a of the motor being jointly coupled by the return line or conductor 158 to the Thy-mo-trol panel, this line having what may be identified as reference point or ground potential. Likewise, coupled with this reference point or ground potential is the conductor 159 extending to one side of the rate determining potentiometer 103. The opposite side of the potentiometer is connected by conductor 160 through the panel to conductor 151. When switch 1FD3 or 1RD1 is closed, 161 is coupled with 162, energized by the Thy-mo-trol at a constant but preferably stepped down voltage as respects the voltage in 156. Adjustable positioning of the member 151, and thus of the potentiometer setting, varies the voltage reaction through conductor 163 on the electronic controls of the Thy-mo-trol and accordingly the rate of operation of motor 47. Line 109 constitutes the output of this controlled voltage coupled either by 1FD2 to 107 or by 1RD2 to 106 and thus to one side or the other of the armature of motor 107 while the opposite side is connected alternatively through 1FD-1 or 1RD-3 through the series field 108a and shunt field 157 to the Thy-mo-trol panel. In the event that it is desired to make use of dynamic braking for motor 47, line 106 is connected at 164 and line 107 at 165 to the panel unit, although these connections are unnecessary so far as the general operation and controls of the present invention are concerned. When 1FD is energized the conductor 109 controlled by the potentiometer is connected through 1FD-2 to the motor line 107, while the opposite motor conductor 106 is coupled through 1FD1 through the series field 108a and conductor 158 to the thy-mo-trol. The electrical and mechanical connections are such that with the circuit thus completed, motor 47 will operate to move the table toward the right.

Centrally mounted on the saddle adjacent the table is a stop block 68 Figures 1 and 2, alternatively engageable by the micrometer adjustable abutments 69 and 70 carried by the dog blocks 71, 72 adjustably secured to the table by bolts 74 engaged in the T-slot 73 of the table. The members 69 and 70 by general positional adjustment along the T-slot and subsequent micrometer adjustment of the abutment elements with respect to their supporting dogs may be set properly to engage the block 68 at one side or the other to provide a definite mechanical stop limiting movement of the table in each direction.

For automatic control of the table movement there is additionally secured on the saddle adjacent the block 68 the pair of limit switches generally designated respectively as LS1 and LS2, Figure 1, each having a normal closed position as shown in Figure 7 and being respectively inwardly displaceable to provide an alternative circuit connection. For effecting automatic actuation of these limit switches the dog block 71 is provided with the abutment arm 75 to contact limit switch arm 76 of LS2 as the table moves toward the right while the dog block 72 has a corresponding arm 77 for engagement with the swinging arm 78 of LS1, as the table moves to the left.

As the table completes its movement toward the right, arm 75 will contact the limit switch member 76, swinging the same in a clockwise direction as viewed in Figure 7. This will interrupt the contact between 76 and 102, and this opens the holding circuit for 1FD. The switches controlled by 1FD will open and the table feed motor 47 will stop. At the same time, actuation of the limit switch will close the contact between member 76a of limit switch LS2 and 111 which is permanently electrically connected to 100 at the point 100d. The circuit thus completed extends through 112 to energize CR2, moving the CR2-1 to CR2-4 series of switch elements upwardly. This will open the normally closed switch CR2-3, while closing switches CR2-1, CR2-2, and CR2-4. A circuit is then completed through 113 to the timer relay TR1, conditioning this for delayed operation to open TR1-1 and close TR1-2 at the completion of the timing interval determined by the adjustable timer delay 80, the period of time interval being adjustably determined as by the settable member 81 This delay timer may be of any conventional commercial type, such as the "CR7504–A3 vacuum tube time delay relay" manufactured by General Electric. Such a relay is adjustable by potentiometer 81 to vary the time delay of response after energization of TR1 before switch TR1-1 opens and switch TR1-2 closes.

In its normal position switch TR1-1 is closed, coupling 100d with line 114 extending to the cross line 115. When CR2 is energized, switch CR2-1 couples 115 with 116 extending to switch blade 117 which in Figure 7 is shown as held in open or circuit interrupting position by cam 118. If, however, the cam is rotated in a counterclockwise direction 117 will complete contact with line 119, while still maintaining switch blade 120 in circuit interrupting position. Continued counterclockwise adjustment of 118 from the position shown will permit both switches 117 and 120 to complete circuits from 116 to 121 through 119, while clockwise adjustment will complete circuit 120—119 only.

It will, therefore, be evident that with cam 118 in the position shown in Figure 7 there can be no current flow through either 116 or 121 to line 119. If, however, either or both of the switch blades 117 and 120 are placed in circuit closing position 119 may be energized. 119 is, in turn, connected with a direction selector switch 122 having the blades 123 and 124. Blade 123 may be positioned to close circuit to line 127 and blade 124 to close circuit to line 128. Circuit from line 127 extends through limit switch LS3 to line 129 while circuit from 128 extends through limit switch LS4 to line 130.

These limit switches are primarily intended for determining ultimate directional movement in or out of the saddle 15 and for this purpose are located as indicated in Figure 2. As there shown, it will be noted that the switches themselves are carried by the knee 12 which is additionally provided with the limiting or abutment block 131. Adjustably supported by bolts 133 in the T-slot 132 on the saddle 15 are the adjustable stop dogs 134 and 135 similar in form and each including a micrometer adjustment stop pin or screw 136 adapted to contact the block 131 as indicated in Figure 3. They are each additionally provided with a flipper dog 137 for engaging suitable rollers 138 and 139 on the actuating arms of the limit switches LS3 and LS4 respectively. It will be evident that clockwise movement of LS4 by dog engagement as indicated in Figures 2 and 3 will move the limit switch, breaking the circuit to 130 and therefore establishing a definite limit for power effected inward movement of the saddle, and that correspondingly forward swinging movement of the control arm of the limit switch LS3 as the saddle moves to the front will interrupt the circuit to line 129.

In the intermediate operative positions of the saddle both of these switches are ordinarily in closed position, and the effectiveness of control is determined by the setting of the switch 124, determining the potential direction of power movement, which in the present instance has been indicated as completing a circuit through 119 to 128.

With the parts so conditioned, energization of 116 will effect a current flow through 124, 128, and 130 and normally closed switch 1FG-4 line 139 to actuate control relay 1RG.

Activation of 1RG will close switches 1RG1, 1RG2, and 1RG3, coupling power lines 61, 62, and 63 to motor 33 to cause rotation of the motor and thus of nut 28 in a direction to feed the saddle inwardly. If not otherwise interrupted, this inward feeding movement will continue until limit switch LS4 is actuated. Alternatively, however, this inward feeding may be discontinued after any selected time interval by the operation of the timer relay TR1. In the event that it is desired to make use of the motor 33 for continuous or appreciable infeed or outfeed movements, control switch button 140 has been provided which if held open will prevent or delay the operation of the timer so that desired continuous operation of motor 33 may be effected.

If, however, switch 140 is closed as when the mechanism is being used for effecting but slight incremental feeds at one or both ends of the table stroke, the timer, as is conventional in such mechanisms, will function after the selected prescribed interval to open TR1-1, thus de-energizing 1RG and stopping operation of the saddle feed motor 33. At the same time this action will close TR1-2, completing circuit through line 141, cross line 142 to switch CR2-2, which is now in closed position due to the energization of CR2.

The control circuit will then be completed through 143, 144 and the normally closed switch arm 78 of LS1, line 145, the closed switch CR1-3 and line 146 to energize 1RD, thus affecting a closing of switches 1RD-1, 1RD-2, and 1RD-3, controlling the coupling of the Thymotrol power lines to the table feed motor 47 but in a manner to reverse the polarity of the series field and cause operation of the motor in a reverse direction from that effected by energization of the control relay 1FD with the result that the table will now be fed toward the left.

At the same time, switch 1RD-4 has been closed, completing the 1RD holding circuit from 100d through 147, 144, so that 1RD will remain energized when CR2 is deenergized and switch CR2–2 opens.

Movement of the table toward the left will release arm 76 of LS2, and arm 76a will swing in a counterclockwise direction, interrupting the control circuit to 100d and deenergizing CR–2.

Movement of the table to the left will continue until arm 77 on dog 72 operates arm 78 of limit switch LS1 interrupting connection through 78 between 144 and 145 and closing the circuit through arm 78a by way of 111a to 148a, thus energizing and causing operation of control relay CR1.

The resultant reactions of energization of control relay CR1 are similar in effect to those produced by previously described energization of controlled relay CR2 so far as discontinuance of operation of the table feed motor, effecting a cross adjustment or indexing of the saddle, assuming that cam 118 is so set that this indexing takes place at the left limit of movement of the table, and the subsequent reestablishing of feeding of the table but in the opposite direction.

The movement of arm 78 of LS1 interrupts or breaks the holding circuit through 1RD–4 while the opening of normally closed switch CR1–3 additionally interrupts the circuit through 146 to 1RD so that the several switches controlling the actuating circuits to effect operation of motor 47 moving the table to the left are interrupted and the motor stops. Switch CR1–4 is closed, energizing control relay TR1 for the delay switch or timer, while switch CR1–1 is closed, coupling 115 to 121 and thus completing the circuit through closed switch blade 120 and the elements 119–124, 128, 130, 1FG–4, 139 to energize 1RG in the same manner as was previously effected by closing of switch CR2–1 previously described. This will initiate operation of motor 33 as before to effect a continuous slight feeding movement of the saddle inwardly.

At the same time switch CR1–2 is closed and maintained in closed position. Upon operation of the timer TR1, switch TR1–1 is opened, interrupting the circuit 115 and thus stopping the operation of motor 33, and switch TR1–2 is closed, completing the circuit through 142, 148, 102, 76, 103a, CR2–3, 104 to energize control relay 1FD. This, as has been previously described, will close the 1FD series of switches to cause operation of motor 47 in a direction to move the table to the right.

This movement will cause the member 77 to release the arm 78a of LS1 which will then move to the position shown in Figure 7, interrupting the circuit 111a—148a to deenergize the solenoid CR1 when the table will complete its cycle of movement to the right, operating LS2 to cause a pause, temporary actuation of motor 33 for saddle indexing and then return stroke of the table as previously described. This will continue until the saddle has reached its rearward limit of movement when the dog 137 will shift 139 as indicated in Figure 3, interrupting the circuit between 128 and 130 so that while there may still be a pause at the end of the table stroke and a subsequent reversal there will be no additional incremental or pick feed movement of the saddle. It is then incumbent on the operator to actuate the stop button 66, discontinuing operation of the machine.

It will, of course, be evident that the pick feed or incremental cross feed movement of the saddle may, if desired, be effected in the opposite direction by closing switch blade 123 to complete the circuit from 119 to 127 and thus through LS3 to 129 and by way of normally closed switch 1RG–4 to the control relay 1FG. The reactions of CR1, CR2, and timer TR1 will be the same with respect to 1FG as previously described in connection with 1RG, the closing of the switch contacts 1FG–1, 1FG–2, and 1FG–3 coupling the power input lines 61, 62, and 63 with motor 33 to effect its operation in a reverse direction as will be evident by reference to Figure 7.

A suitable control box 150 is carried by the knee of the machine as shown in Figure 1 having the start switch button 67, stop switch button 66 and the settable control 154 for the cam 118, 151 for the potentiometer rate adjuster 108, 152 for the selection of forward or reverse pick feed switches 123—124 and 153 for the member 81 for determination of timer delay or amount of pick feed automatically effected at each reversal.

From the foregoing description, the construction and operation of the several manual and automatic controls of the present improved milling machine should be readily apparent. It will be noted that the movements of the saddle and table may be manually controlled if desired and that under these conditions certain adjustable stop mechanisms have been provided which may be set positively to limit the extent of reciprocation of the work table and the forward or backward adjustment of the table and saddle as a unit. It will be further noted that by locking the manual adjusting devices against operation the machine is then conditioned for automatic control by virtue of the supplemental power driving mechanisms, and the various interlocked mechanical and electrical cycle control mechanisms illustrated.

Additionally, it will be noted that certain of the control mechanisms for the power operating devices are so positioned and arranged as to cooperate with the mechanical stop device so that the limitations on the cycle movement will be the same under either manual or automatic control with the result that the manual control devices may be employed for initial set-up purposes or trying out of the machine and that by then throwing over to the automatic controls the desired repetitive cycle of movement may be accurately effected within the previously prescribed and predetermined limits.

It will further be evident that while the control mechanism as shown and described is particularly adapted for utilization in connection with reproducing operations, that the controls in question may likewise be employed for determination of relative movements of a pair of machine tool slides relatively adjustable in two angularly related paths whether said slides are superimposed as illustrated or independently supported and whether milling, grinding or like operations are being performed which require successive relative positioning of the slides and either with or without pattern and tracer control of additional slide movements.

What is claimed is:

1. A control mechanism for a machine tool slide which is supported for movement in two angularly related directions, said control mechanism including a first drive motor for effecting movement of the slide in one of said directions, and a second drive motor for effecting movement of the slide in the other of said angularly related directions, trip operable means effective to deenergize the first drive motor and initiate operation of the second motor, a delayed action timer device for determining the time of operation of the second motor, and means controlled by the timer for initiating reverse activation of the first drive motor.

2. In a milling machine embodying a pair of slides mounted for movement in angularly related directions, a first motor for effecting movement of one of the slides in one of said angularly related directions, a second motor for effecting movement in the other angularly related direction, and control means for said motors including a power circuit individual to each of said motors, a trip device operable by movement of one of said slides for interrupting the power circuit to one of the motors and effecting actuation of the other of said motors, and means to determine the extent of actuation of said second motor, said means including a delayed action electric timer energized by operation of said trip device.

3. In a milling machine embodying a pair of slides mounted for movement in angularly related direction, a first motor for effecting movement of one of the slides in one of said angularly related directions, a second motor for effecting movement in the other angularly related direction, and control means for said motors including a power circuit individual to each of said motors, a trip device operable by movement of one of said slides for interrupting the power circuit to one of the motors and effecting actuation of the other of said motors, means to determine the extent of actuation of said second motor, said means including a delayed action electric timer energized by operation of said trip device, and an adjuster to vary the period of delay of the timer operation.

4. In a milling machine embodying a pair of slides mounted for movement in angularly related directions, a first motor for effecting movement of one of the slides in one of said angularly related directions, a second motor for effecting movement in the other angularly related direction, and control means for said motors including a power circuit individual to each of said motors, a trip device operable by movement of one of said slides for interrupting the power circuit to one of the motors and effecting actuation of the other of said motors, means to determine the extent of actuation of said second motor, said means including a delayed action electric timer energized by operation of said trip device, switch means for reversing the operation of the first motor, and an electric circuit completable by the timer for operating the switch means to initiate reversal of the first motor.

5. In a milling machine embodying a pair of slides mounted for movement in angularly related directions, a first motor for effecting movement of one of the slides in one of said angularly related directions, a second motor for effecting movement in the other angularly related direction, and control means for said motors including a power circuit individual to each of said motors, a trip device operable by movement of one of said slides for interrupting the power circuit to one of the motors and effecting actuation of the other of said motors, a control circuit including a delayed action electrical timer effective on movement to determine the extent of actuation of said second motor, a selector in said control circuit for determining the direction of actuation of said second motor as controlled by the timer, and a trip operable limit switch in said circuit for interrupting the control circuit to prevent actuation of said second motor in the direction determined by the selector.

6. In a milling machine, the combination with a translatable slide, of a reversible motor coupled with the slide for actuation thereof, a power circuit for the motor, individual switches intervening the power circuit and the motor and selectively positionable to effect one or the other direction of actuation of the motor, a first limit switch for determining the extent of movement of the slide in one direction, a second limit switch for determining the extent of movement of the slide in the opposite direction as effected by said motor, switch control circuits for the respective motor reversing switches coupled with said limit switches, and a common control circuit including a delay device coupled with said limit switch circuits for effecting a delay in activation of the respective reversing switches when either of said limit switches is activated.

7. In a milling machine, the combination with a translatable slide, of a reversible motor coupled with the slide for actuation thereof, a power circuit for the motor, individual switches intervening the power circuit and the motor and selectively positionable to effect one or the other direction of actuation of the motor, a first limit switch for determining the extent of movement of the slide in one direction, a second limit switch for determining the extent of movement of the slide in the opposite direction as effected by said motor, switch control circuits for the respective motor reversing switches coupled with said limit switches, a common control circuit including a delay device coupled with said limit switch circuits for effecting a delay in activation of the respective reversing switches when either of said limit switches is activated, an indexing motor, an electrically operable control switch for the indexing motor, and an actuating circuit for the control switch completable by way of the delay device to determine the extent of activation of the indexing motor.

8. In a milling machine, the combination with a translatable slide, of a reversible motor coupled with the slide for actuation thereof, a power circuit for the motor, individual switches intervening the power circuit and the motor and selectively positionable to effect one or the other direction of actuation of the motor, a first limit switch for determining the extent of movement of the slide in one direction, a second limit switch for determining the extent of movement of the slide in the opposite direction as effected by said motor, switch control circuits for the respective motor reversing switches coupled with said limit switches, a common control circuit including a delay device coupled with said limit switch circuits for effecting a delay in activation of the respective reversing switches when either of said limit switches is activated, an indexing motor, an electrically operable control switch for the indexing motor, an actuating circuit for the control switch completable by way of the delay device to determine the extent of activation of the indexing motor, and a selector for determining the effective coupling of the actuating circuit with the control switch.

9. In a milling machine, the combination with a translatable slide, of a reversible motor coupled with the slide for actuation thereof, a power circuit for the motor, individual switches intervening the power circuit and the motor and selectively positionable to effect one or the other direction of actuation of the motor, a first limit switch for determining the extent of movement of the slide in one direction, a second limit switch for determining the extent of movement of the slide in the opposite direction as effected by said motor, switch control circuits for the respective motor reversing switches coupled with said limit switches, a common control circuit including a delay device coupled with said limit switch circuits for effecting a delay in activation of the respective reversing switches when either of said limit switches is activated, an indexing motor, an electrically operable control switch for the indexing motor, an actuating circuit for the control switch completable by way of the delay device to determine the extent of activation of the indexing motor, a selector for determining the effective coupling of the actuating circuit with the control switch, and an additional selector in series with the first-mentioned selector for determining the direction of activation of the indexing motor.

10. A control mechanism for a milling machine or the like of the type having a pair of slides movable in angularly related directions, said control mechanism including a first motor for actuation of one of the slides and a second motor for actuation of the other of the slides, and means for effecting alternative operation of said motors, including a normally open power switch for the first motor, a control relay for said switch, a normally open power switch for the second motor, a control relay for the said latter switch, a control circuit for said first relay including a limit switch for interrupting the control circuit to the relay of the first motor, a control circuit for the second motor, a relay control switch for the circuit, an auxiliary circuit activatable by movement of the limit switch to energize said relay, a timer delay serially mounted in the control circuit for determining the extent of activation of said second motor, a relay controlled reversing switch for the first motor, and alternatively effective switch means under control of the timer delay for activating the relay of the reversing switch to effect reverse actuation of said first motor subsequent to timer delay determined interruption of the operation of the second motor.

11. A control mechanism for a machine tool slide which is supported for movement in two angularly related directions, said control mechanism including a slide feeding motor and feed motor actuating circuit, a slide indexing motor and index motor actuating circuit, and a pilot control circuit variably effective to determine the operative effects of the index motor and feed motor actuating circuits, said pilot circuit including a two-position limit switch for controlling the feed motor circuit, dog means movable by the feed motor for determining the positionings of the limit switch, a control relay circuit including a control relay activatable by one direction of movement of the limit switch, a timer operating circuit including a timer relay, switch means movable by activation of the control relay circuit to energize the timer relay, an index motor circuit control switch, a control relay for the index motor circuit control switch, and means for completing the pilot circuit by way of the timer and the control relay circuit switch to energize the index motor circuit control relay.

12. A control mechanism for a machine tool slide which is supported for movement in two angularly related directions, said control mechanism including a slide feeding motor and feed motor actuating circuit, a slide indexing motor and index motor actuating circuit, and a pilot control circuit variably effective to determine the operative effects of the index motor and feed motor actuating circuits, said pilot circuit including a two-position limit switch for controlling the feed motor circuit, dog means movable by the feed motor for determining the positionings of the limit switch, a control relay circuit including a control relay activatable by one direction of movement of the limit switch, a timer operating circuit including a timer relay, switch means movable by activation of the control relay circuit to energize the timer relay, an index motor circuit control switch, a control relay for the index motor circuit control switch, means for completing the pilot circuit by way of the timer and the control relay circuit switch to energize the index motor circuit control relay, a second index motor control circuit including a second control relay, and a selector switch for determining the effective coupling of the timer controlled pilot circuit with one or the other of said index motor circuit control relays, a second limit switch coupled to control the feed motor circuit, and a selector in the pilot circuit intervening the timer and the index motor circuit control relays to determine the effective coupling of the pilot circuit with the respective limit switches.

13. A control mechanism for a machine tool slide which is supported for movement in two angularly related directions, said control mechanism including a slide feeding motor and feed motor actuating circuit, a slide indexing motor and index motor actuating circuit, and a pilot control circuit variably effective to determine the operative effects of the index motor and feed motor actuating circuits, said pilot circuit including a two-position limit switch for controlling the feed motor circuit, dog means movable by the feed motor for determining the positionings of the limit switch, a control relay circuit including a control relay activatable by one direction of movement of the limit switch, a timer operating circuit including a timer relay, switch means movable by activation of the control relay circuit to energize the timer relay, an index motor circuit control switch, a control relay for the index motor circuit control switch, means for completing the pilot circuit by way of the timer and the control relay circuit switch to energize the index motor circuit control relay, a second index motor control circuit including a second control relay, and a selector switch for determining the effective coupling of the timer controlled pilot circuit with one or the other of said index motor circuit control relays, a second limit switch coupled to control the feed motor circuit, a selector in the pilot circuit intervening the timer and the index motor circuit control relays to determine the effective coupling of the pilot circuit with the respective limit switches, a reversing switch for the feed motor circuit, and an additional timer completable pilot control circuit, and means to couple said circuit with said motor reversing switch to close the switch and initiate reverse operation of the feed motor upon firing of the timer.

14. A control mechanism for a machine tool slide which is supported for movement in two angularly related directions, said control mechanism including a slide feeding motor and feed motor actuating circuit, a slide indexing motor and index motor actuating circuit, and a pilot control circuit variably effective to determine the operative effects of the index motor and feed motor actuating circuits, said pilot circuit including a two-position limit switch for controlling the feed motor circuit, dog means movable by the feed motor for determining the positionings of the limit switch, a control relay circuit including a control relay activatable by one direction of movement of the limit switch, a timer operating circuit including a timer relay, switch means movable by activation of the control relay circuit to energize the timer relay, an index motor circuit control switch, a control relay for the index motor circuit control switch, means for completing the pilot circuit by way of the timer and the control relay circuit switch to energize the index motor circuit control relay, a second index motor control circuit including a second control relay, and a selector switch for determining the effective coupling of the timer controlled pilot circuit with one or the other of said index motor circuit control relays, a second limit switch coupled to control the feed motor circuit, a selector in the pilot circuit intervening the timer and the index motor circuit control relays to determine the effective coupling of the pilot circuit with the respective limit switches, a reversing switch for the feed motor circuit, an additional timer completable pilot control circuit, and means to couple said circuit with said motor reversing switch to close the switch and initiate reverse operation of the feed motor upon firing of the timer, and a holding circuit for the reversing switch completable by way of the limit switch to maintain the reversing switch in timer circuit initiated closed position.

15. A control mechanism for a machine tool slide which is supported for movement in two angularly related directions, said control mechanism including a slide feeding motor and feed motor actuating circuit, a slide indexing motor and index motor actuating circuit, and a pilot control circuit variably effective to determine the operative effects of the index motor and feed motor actuating circuits, said pilot circuit including a two position limit switch for controlling the feed motor circuit, dog means movable by the feed motor for determining the positionings of the limit switch, a control relay circuit including a control relay activatable by one direction of movement of the limit switch, a timer operating circuit including a timer relay, switch means movable by activation of the control relay circuit to energize the timer relay, an index motor circuit control switch, a control relay for the index motor circuit control switch, means for completing the pilot circuit by way of the timer and the control relay circuit switch to energize the index motor circuit control relay, a second index motor control circuit including a second control relay, and a selector switch for determining the effective coupling of the timer controlled pilot circuit with one or the other of said index motor circuit control relays, a second limit switch coupled to control the feed motor circuit, a selector in the pilot circuit intervening the timer and the index motor circuit control relays to determine the effective coupling of the pilot circuit with the respective limit switches, a reversing switch for the feed motor circuit, an additional timer completable pilot control circuit, and means to couple said circuit with said motor reversing switch to close the switch and initiate reverse operation of the feed motor upon firing of the timer, and a holding circuit for the motor reverser switch including a switch element in series with the limit switch and movable with the reverser switch to complete the holding circuit and maintain the reverser switch in timer pilot circuit effected position.

16. A control mechanism for a machine tool slide which is supported for movement in two angularly related directions, said control mechanism including a slide feeding motor and feed motor actuating circuit, a slide indexing motor and index motor actuating circuit, and a pilot control circuit variably effective to determine the operative effects of the index motor and feed motor actuating circuits, said pilot circuit including a two position limit switch for controlling the feed motor circuit, dog means movable by the feed motor for determining the positionings of the limit switch, a control relay circuit including a control relay activatable by one direction of movement of the limit switch, a timer operating circuit including a timer relay, switch means movable by activation of the control relay circuit to energize the timer relay, an index motor circuit control switch, a control relay for the index motor circuit control switch, means for completing the pilot circuit by way of the timer and the control relay circuit switch to energize the index motor circuit control relay, a second index motor control circuit including a second control relay, and a selector switch for determining the effective coupling of the time controlled pilot circuit with one or the other of said index motor circuit control relays, a second limit switch coupled to control the feed motor circuit, a selector in the pilot circuit intervening the timer and the index motor circuit control relays to determine the effective coupling of the pilot circuit with the respective limit switches, a reversing switch for the feed motor circuit, an additional timer completable pilot control circuit, and means to couple said circuit with said motor reversing switch to close the switch and initiate reverse operation of the feed motor upon firing of the timer, a holding circuit for the motor reverser switch including a switch element in series with the limit switch and movable with the reverser switch to complete the holding circuit and maintain the reverser switch in timer pilot circuit effected postion, an additional limit switch, a control circuit completable thereby and supplemental switch means including a control relay switch activatable by the additional limit switch circuit to break the holding circuit for the motor reverser switch.

17. A control mechanism for a machine tool slide which is supported for movement in two angularly related directions, said control mechanism including a slide feeding motor and feed motor actuating circuit, a slide indexing motor and index motor actuating circuit, and a pilot control circuit variably effective to determine the operative effects of the index motor and feed motor actuating circuits, said pilot circuit including a two position limit switch for controlling the feed motor circuit, dog means movable by the feed motor for determining the positioning of the limit switch, a control relay circuit including a control relay activatable by one direction of movement of the limit switch, a timer operating circuit including a timer relay, switch means movable by activation of the control relay circuit to energize the timer relay, an index motor circuit control switch, a control relay for the index motor circuit control switch, means for completing the pilot circuit by way of the timer and the control relay circuit switch to energize the index motor circuit control relay, a second index motor control circuit including a second control relay, and a selector switch for determining the effective coupling of the timer controlled pilot circuit with one or the other of said index motor circuit control relays, a second limit switch coupled to control the feed motor circuit, a selector in the pilot circuit intervening the timer and the index motor circuit control relays to determine the effective coupling of the pilot circuit with the respective limit switches, a reversing switch for the feed motor circuit, an additional timer completable pilot control circuit, and means to couple said circuit with said motor reversing switch to close the switch and initiate reverse operation of the feed motor upon firing of the timer, a holding circuit for the motor reverser switch including a switch element in series with the limit switch and movable with the reverser switch to complete the holding circuit and maintain the reverser switch in timer pilot circuit effected position, an additional limit switch, a control circuit completable thereby, supplemental switch means including a control relay switch activatable by the additional limit switch circuit to break the holding circuit for the motor reverser switch, and a supplemental timer activating circuit including a switch element movable on actuation of said second limit switch to complete the circuit and activate the timer.

References Cited in the file of this patent
UNITED STATES PATENTS

| | | |
|---|---|---|
| 1,512,574 | Blood | Oct. 21, 1924 |
| 1,570,369 | Blood | Jan. 19, 1926 |
| 1,598,115 | Blood | Aug. 31, 1926 |
| 1,877,828 | Einstein | Sept. 20, 1932 |
| 1,978,389 | Sassen | Oct. 23, 1934 |
| 2,029,335 | Oberhoffken | Feb. 4, 1936 |
| 2,333,341 | Scrivener | Nov. 2, 1943 |
| 2,350,722 | Buckingham | June 6, 1944 |
| 2,398,500 | Jaeger | Apr. 16, 1946 |
| 2,420,024 | Woodbury | May 6, 1947 |
| 2,447,848 | Edwards | Aug. 24, 1948 |